US012631990B2

(12) United States Patent
Shigehiro

(10) Patent No.: US 12,631,990 B2
(45) Date of Patent: May 19, 2026

(54) DEVELOPMENT APPARATUS

(71) Applicant: CANON KABUSHIKI KAISHA, Tokyo (JP)

(72) Inventor: Koji Shigehiro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/818,252

(22) Filed: Aug. 28, 2024

(65) Prior Publication Data

US 2025/0076788 A1 Mar. 6, 2025

(30) Foreign Application Priority Data

Sep. 4, 2023 (JP) ................................ 2023-143076

(51) Int. Cl.
*G03G 15/09* (2006.01)
*B24C 3/10* (2006.01)
*G03G 15/08* (2006.01)

(52) U.S. Cl.
CPC ........... *G03G 15/0928* (2013.01); *B24C 3/10* (2013.01); *G03G 15/0808* (2013.01); *G03G 15/0815* (2013.01); *G03G 15/0891* (2013.01)

(58) Field of Classification Search
CPC ........... G03G 15/0921; G03G 15/0812; G03G 15/0818; G03G 15/09; G03G 15/0808; G03G 2215/0609
See application file for complete search history.

(56) References Cited

U.S. PATENT DOCUMENTS

| | | | | |
|---|---|---|---|---|
| 12,078,942 B2 * | 9/2024 | Takahashi .......... | G03G 15/0893 |
| 2004/0028428 A1 * | 2/2004 | Sugihara ............ | G03G 15/0928 399/267 |
| 2008/0181675 A1 * | 7/2008 | Fujishima .......... | G03G 15/0815 399/267 |
| 2009/0010683 A1 * | 1/2009 | Morimoto .......... | G03G 15/0812 430/319 |
| 2016/0091829 A1 * | 3/2016 | Noguchi ............ | G03G 15/0928 399/277 |
| 2017/0357188 A1 * | 12/2017 | Ishizuka ............ | G03G 21/1647 |
| 2018/0217521 A1 | 8/2018 | Furuta | |

FOREIGN PATENT DOCUMENTS

| | | |
|---|---|---|
| JP | 2002031948 A | 1/2002 |
| JP | 2003167435 A | 6/2003 |
| JP | 2011022227 A | 2/2011 |
| JP | 2018124338 A | 8/2018 |

* cited by examiner

*Primary Examiner* — Jessica L Eley
(74) *Attorney, Agent, or Firm* — Canon U.S.A., Inc., IP Division

(57) ABSTRACT

Disclosed is a development apparatus that includes a first roller to be supplied with developer accommodated in a first chamber, a first magnet, a second roller to which the developer is delivered from the first roller through a magnetic field generated by the first magnet, which is arranged to face the first roller, the second roller bearing and conveying the developer to collect the developer in a second chamber after the electrostatic latent image is developed, and a second magnet, in a case where ten-point average roughness of an outer circumferential surface of the first roller is Rz1 and ten-point average roughness of an outer circumferential surface of the second roller is Rz2, $0.35\times Rz1 \leq Rz2$ and $7\ \mu m \leq Rz1 \leq 15\ \mu m$.

10 Claims, 11 Drawing Sheets

GROOVE RATIO ρ = (GROOVE WIDTH d × NUMBER OF GROOVES N) / CIRCUMFERENTIAL LENGTH L

FIG.4A

SURFACE ROUGHNESS Rz1 OF SECOND DEVELOPMENT SLEEVE [μm]

| | | 15 | 11 | 9 | 7 |
|---|---|---|---|---|---|
| Rz2/Rz1 | 120% | ○ | ○ | ○ | ○ |
| | 100% | ○ | ○ | ○ | ○ |
| | 70% | ○ | ○ | ○ | ○ |
| | 40% | ○ | ○ | ○ | △ |
| | 35% | ○ | ○ | ○ | △ |
| | 30% | ○ | ○ | ○ | △ |

FIG.4B

SURFACE ROUGHNESS Rz1 OF SECOND DEVELOPMENT SLEEVE [μm]

| | | 15 | 11 | 9 | 7 |
|---|---|---|---|---|---|
| Rz2/Rz1 | 120% | ◆ | ◆ | ○ | ○ |
| | 100% | ○ | ○ | ○ | ○ |
| | 70% | ○ | ○ | ○ | ○ |
| | 40% | ○ | ○ | ○ | △ |
| | 35% | ○ | △ | △ | × |
| | 30% | △ | × | × | × |

GROOVE RATIO ρ = (GROOVE WIDTH d × NUMBER OF GROOVES N) / CIRCUMFERENTIAL LENGTH L

FIG.6A

GROOVE RATIO OF SECOND DEVELOPMENT SLEEVE ρ1

| | | 0.25 | 0.23 | 0.15 | 0.07 | 0.06 |
|---|---|---|---|---|---|---|
| ρ2/ρ1 | 167% | × | ○ | ○ | ○ | × |
| | 153% | ○ | ○ | ○ | ○ | × |
| | 100% | ○ | ○ | ○ | ○ | × |
| | 53% | ○ | ○ | ○ | × | × |
| | 40% | ○ | ○ | × | × | × |

FIG.6B

GROOVE RATIO OF SECOND DEVELOPMENT SLEEVE ρ1

| | | 0.25 | 0.23 | 0.15 | 0.07 | 0.06 |
|---|---|---|---|---|---|---|
| ρ2/ρ1 | 167% | × | ○ | ○ | ○ | × |
| | 153% | ○ | ○ | ○ | ○ | × |
| | 100% | ○ | ○ | ○ | △ | × |
| | 53% | ○ | ○ | △ | × | × |
| | 40% | △ | × | × | × | × |

FIG.8A

SURFACE ROUGHNESS Rz1 OF SECOND DEVELOPMENT SLEEVE

| ρ2 | Rz CONVERSION VALUE | 17 | 15 | 11 | 9 | 7 |
|---|---|---|---|---|---|---|
| 0.25 | 18.2 | ◆ | ◆ | ○ | ○ | ○ |
| 0.23 | 16.9 | ○ | ○ | ○ | ○ | ○ |
| 0.15 | 11.5 | ○ | ○ | ○ | ○ | ○ |
| 0.08 | 6.8 | ○ | ○ | ○ | △ | △ |
| 0.06 | 5.5 | ○ | △ | △ | × | × |

FIG.8B

SURFACE ROUGHNESS Rz1 OF SECOND DEVELOPMENT SLEEVE

| ρ2 | Rz CONVERSION VALUE | 17 | 15 | 11 | 9 | 7 |
|---|---|---|---|---|---|---|
| 0.25 | 18.2 | ◆ | ◆ | ◆ | ○ | ○ |
| 0.23 | 16.9 | ◆ | ○ | ○ | ○ | ○ |
| 0.15 | 11.5 | ○ | ○ | ○ | ○ | ○ |
| 0.08 | 6.8 | ○ | △ | △ | △ | △ |
| 0.06 | 5.5 | △ | △ | × | × | × |

FIG.9A

GROOVE RATIO OF SECOND DEVELOPMENT SLEEVE ρ1

| Rz2 | ρ CONVERSION VALUE | 0.25 | 0.23 | 0.15 | 0.07 | 0.06 |
|---|---|---|---|---|---|---|
| 17 | 0.23 | ◆ | ○ | ○ | ○ | × |
| 15 | 0.20 | ◆ | ○ | ○ | ○ | × |
| 11 | 0.14 | ○ | ○ | ○ | ○ | × |
| 9 | 0.11 | ○ | ○ | ○ | ○ | × |
| 7 | 0.08 | ○ | ○ | ○ | ○ | × |
| 5.5 | 0.06 | ○ | ○ | ○ | △ | × |

FIG.9B

GROOVE RATIO OF SECOND DEVELOPMENT SLEEVE ρ1

| Rz2 | ρ CONVERSION VALUE | 0.25 | 0.23 | 0.15 | 0.07 | 0.06 |
|---|---|---|---|---|---|---|
| 17 | 0.23 | ◆ | ◆ | ○ | ○ | × |
| 15 | 0.20 | ◆ | ○ | ○ | ○ | × |
| 11 | 0.14 | ◆ | ○ | ○ | ○ | × |
| 9 | 0.11 | ○ | ○ | ○ | ○ | × |
| 7 | 0.08 | ○ | ○ | ○ | ○ | × |
| 5.5 | 0.06 | ○ | △ | △ | △ | × |

FIG.11A

SURFACE ROUGHNESS Rz1 OF SECOND DEVELOPMENT SLEEVE [μm]

| | | 17 | 15 | 11 | 9 | 7 |
|---|---|---|---|---|---|---|
| Rz2/Rz1 | 120% | ◆ | ◆ | ◆ | ○ | ○ |
| | 100% | ◆ | ◆ | ○ | ○ | ○ |
| | 70% | ○ | ○ | ○ | ○ | ○ |
| | 40% | ○ | ○ | ○ | △ | △ |
| | 35% | ○ | ○ | △ | △ | × |
| | 30% | △ | △ | × | × | × |

FIG.11B

SURFACE ROUGHNESS Rz1 OF SECOND DEVELOPMENT SLEEVE [μm]

| | | 17 | 15 | 11 | 9 | 7 |
|---|---|---|---|---|---|---|
| Rz2/Rz1 | 120% | ◆ | ◆ | ○ | ○ | ○ |
| | 100% | ◆ | ○ | ○ | ○ | ○ |
| | 70% | ○ | ○ | ○ | ○ | ○ |
| | 40% | ○ | ○ | ○ | ○ | ○ |
| | 35% | ○ | ○ | ○ | ○ | △ |
| | 30% | △ | △ | △ | △ | × |

DEVELOPMENT APPARATUS

BACKGROUND

Field

The present disclosure relates to a development apparatus which develops an electrostatic latent image formed on an image bearing member with developer.

Description of the Related Art

A development apparatus may include a separating roller for separating and collecting developer from a development roller for developing an electrostatic latent image formed on an image bearing member with developer has been known. See, e.g., U.S. 2018/0217521 to Konica Minolta, Inc. The development roller may include a rotating development sleeve and a non-rotating development magnet arranged inside the development sleeve, and the development sleeve may bear developer on its surface through a magnetic force generated by the development magnet. Similarly, the separating roller may include a rotating separating sleeve and a non-rotating separating magnet arranged inside the separating sleeve, and the separating sleeve may bear developer on its surface through a magnetic force generated by the separating magnet. After the electrostatic latent image formed on the image bearing member is developed with the developer borne and conveyed by the development sleeve, the separating roller may collect the developer (used developer) from the development roller while bearing the developer on the surface of the separating sleeve.

There may be a risk that the used developer conveyed by the development sleeve cannot be sufficiently collected by the separating roller if a developer conveyance capability possessed by the separating sleeve is not at or above a certain level, in contrast to the developer conveyance capability possessed by the development sleeve. The used developer which cannot be collected by the separating roller is dragged around with the development sleeve, or supplied to the development sleeve again after falling down. As a result, the above-described phenomenon has an influence on a distribution of a toner-to-developer (TD) ratio (a ratio of toner weight to a total weight of carriers and toner) of the developer borne on the development sleeve, so as to cause occurrence of image failure, such as variation in color, of developed toner images.

SUMMARY

The present disclosure is directed to a technique which suppresses occurrence of a dragging phenomenon of developer in the development sleeve, while improving the developer conveyance capability possessed by the separating sleeve in contrast to the developer conveyance capability possessed by the development sleeve.

An aspect of the present disclosure provides a development apparatus that includes a first chamber configured to accommodate developer including toner and carriers; a second chamber separated from the first chamber by a partition wall; a first roller to which the developer is supplied, the first roller being configured to bear and convey the developer to develop an electrostatic latent image formed on an image bearing member; a first magnet arranged within the first roller; rotating member; a second roller to which the developer is delivered, the second roller being arranged to face the first roller, the second roller being configured to collect the developer in the second chamber after the electrostatic latent image is developed; and a second magnet arranged within the second roller. In a case where a ten-point average roughness of an outer circumferential surface of the first roller is Rz1, and a ten-point average roughness of an outer circumferential surface of the second roller is Rz2, $0.35 \times Rz1 \leq Rz2$ and 7 μm (micrometers)$\leq Rz1 \leq$15 μm.

Another aspect of the present disclosure provides a development apparatus that includes a first chamber configured to accommodate developer including toner and carriers; a second chamber separated from the first chamber by a partition wall; a first roller to which the developer is supplied, the first roller being configured to bear and convey the developer to develop an electrostatic latent image; a first magnet fixed arranged within the first roller; a second roller to which the developer is delivered, the second roller being arranged to face the first roller, the second roller being configured to collect the developer in the second chamber after the electrostatic latent image is developed; and a second magnet arranged within the second roller. A plurality of first grooves is formed on an outer circumferential surface of the first roller along a circumferential direction of the first roller. A plurality of second grooves is formed on an outer circumferential surface of the second roller along a circumferential direction of the second roller. In a case where a width of the first groove is d1, a number of the first grooves per circumference of the first roller is N1, a circumferential length of the first roller is L1, and a groove ratio ρ1 of the first groove is $\rho 1=(d1 \times N1)/L1$, whereas a width of the second groove is d2, the number of the second grooves per circumference of the second roller is N2, a circumferential length of the second roller is L2, and a groove ratio ρ2 of the second groove is $\rho 2=(d2 \times N2)/L2$, with $0.40 \times \rho 1 \leq \rho 2$ and $0.07 \leq \rho 1 \leq 0.23$.

Further features of the present disclosure will become apparent from the following description of exemplary embodiments with reference to the attached drawings.

BRIEF DESCRIPTION OF THE DRAWINGS

FIG. 4A is a table illustrating occurrence or non-occurrence of a dragging phenomenon of developer in a second development sleeve in a case where the development apparatus according to a first exemplary embodiment is driven at a predetermined process speed. FIG. 4B is a table illustrating occurrence or non-occurrence of the dragging phenomenon of developer in the second development sleeve in a case where the development apparatus according to the first exemplary embodiment is driven at increased process speed.

FIG. 6A is a table illustrating occurrence or non-occurrence of a dragging phenomenon of developer in the second development sleeve in a case where the development apparatus according to the second exemplary embodiment is driven at a predetermined process speed. FIG. 6B is a table illustrating occurrence or non-occurrence of the dragging phenomenon of developer in the second development sleeve in a case where the development apparatus according to the second exemplary embodiment is driven at increased process speed.

FIG. 8A is a table illustrating occurrence or non-occurrence of the dragging phenomenon of developer in the second development sleeve in a case where the development apparatus according to a third exemplary embodiment is driven at a predetermined process speed. FIG. 8B is a table illustrating occurrence or non-occurrence of the dragging phenomenon of developer in the second development sleeve in a case where the development apparatus according to the third exemplary embodiment is driven at increased process speed, when the surface roughness of the second development sleeve is Rz and the groove ratio of a separating sleeve is ρ.

FIG. 9A is a table illustrating occurrence or non-occurrence of the dragging phenomenon of developer in the second development sleeve in a case where the development apparatus according to the third exemplary embodiment is driven at a predetermined process speed. FIG. 9B is a table illustrating occurrence or non-occurrence of the dragging phenomenon of developer in the second development sleeve in a case where the development apparatus according to the third exemplary embodiment is driven at increased process speed, when the groove ratio of the second development sleeve is p, and the surface roughness of the separating sleeve is Rz.

FIG. 11A is a table illustrating occurrence or non-occurrence of the dragging phenomenon of developer in the second development sleeve in a case where the development apparatus according to the first exemplary embodiment is driven at increased predetermined process speed. FIG. 11B is a table illustrating occurrence or non-occurrence of the dragging phenomenon of developer in the second development sleeve in a case where the development apparatus according to the fourth exemplary embodiment is driven at increased predetermined process speed.

DESCRIPTION OF THE EMBODIMENTS

Figure 1:
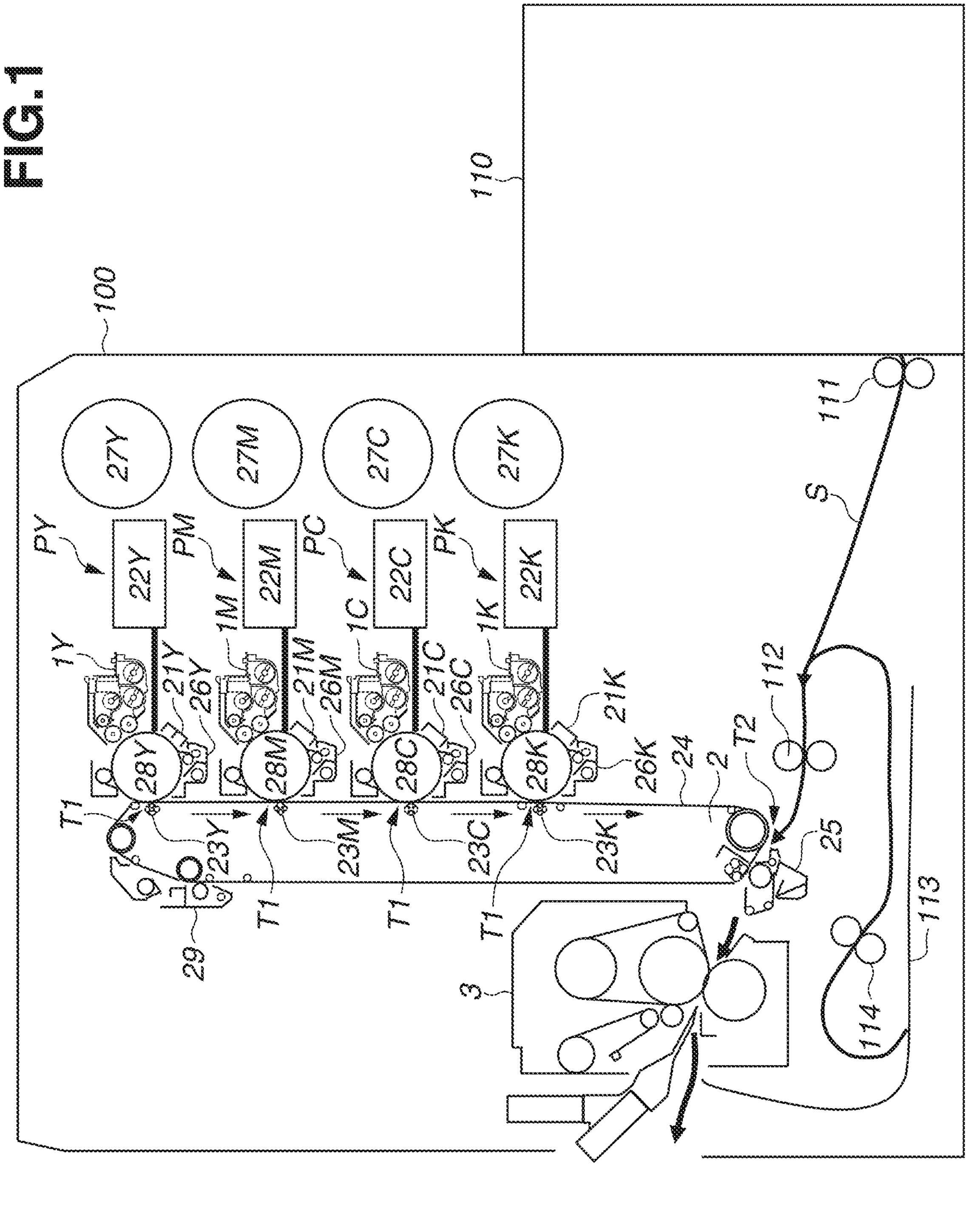
FIG. 1 is a cross-sectional diagram illustrating a schematic configuration of an image forming apparatus according to a first exemplary embodiment.

A first exemplary embodiment will now be described with reference to FIG. 1 and FIGS. 4A and 4B. A schematic configuration of an image forming apparatus according to the present exemplary embodiment will be described with reference to FIG. 1.

[Image Forming Apparatus]

An image forming apparatus 100 is a full-color image forming apparatus. In the present exemplary embodiment, the image forming apparatus 100 is a multi-function peripheral having a copy function, a printing function, and a scanning function. As illustrated in FIG. 1, the image forming apparatus 100 includes image forming units PY, PM, PC, and PK for executing image forming processing of toner images in four colors, e.g., yellow (Y), magenta (M), cyan (C), and black (K), which are arranged next to each other. The image forming apparatus 100 according to the present exemplary embodiment includes a document reading apparatus connected to a main body (apparatus main body) of the image forming apparatus 100 or a host device, such as a personal computer, communicably connected to the apparatus main body. Thus, the image forming apparatus 100 can form a full-color image in four colors (Y, M, C, and K) on a recording material (e.g., a recording sheet, a plastic sheet, and a fabric) through an electrophotographic method.

The image forming units PY, PM, PC, and PK of the respective colors include primary charging devices 21Y, 21M, 21C, and 21K, development apparatuses 1Y, 1M, 1C, and 1K, optical writing units (exposure apparatuses) 22Y, 22M, 22C, and 22K, photosensitive drums 28Y, 28M, 28C, 28K, and cleaning apparatuses 26Y, 26M, 26C, and 26K, respectively. Further, the image forming apparatus 100 includes a transfer apparatus 2 and a fixing apparatus 3. Configurations of the image forming units PY, PM, PC, and PK of respective colors are similar to each other, and thus the configuration will be described by using the image forming unit PY as a representative of the image forming units PY, PM, PC, and PK.

The photosensitive drum 28Y (image bearing member) is a photosensitive member having a photosensitive layer made of resin, such as polycarbonate, including an organic photo conductor (OPC). The photosensitive drum 28Y rotates at a predetermined speed. The primary charging device 21Y includes a corona discharge electrode arranged in the periphery of the photosensitive drum 28Y. The primary charging device 21Y electrically charges the surface of the photosensitive drum 28Y with ion generated from the corona discharge electrode.

A scanning optical apparatus is built into the optical writing unit 22Y. Based on image data, the optical writing unit 22Y exposes the charged photosensitive drum 28Y to light and lowers the potential of the exposed portion to form a charge pattern (electrostatic latent image) corresponding to the image data. The development apparatus 1Y develops the electrostatic latent image formed on the photosensitive drum 28Y by applying the developer stored in the development apparatus 1Y to the photosensitive drum 28Y. The developer is composed of mixture of carriers and toner corresponding to each color, and the electrostatic latent image is visualized with toner.

The transfer apparatus 2 includes primary transfer rollers 23Y, 23M, 23C, and 23K, an intermediate transfer belt 24, and a secondary transfer roller 25. The intermediate transfer belt 24 is wound around and stretched upon the primary transfer rollers 23Y, 23M, 23C, and 23K and a plurality of rollers, and is supported in a rotatable state.

The primary transfer rollers 23Y, 23M, 23C, and 23K serving as primary transfer members, respectively corresponding to colors of Y, M, C, and K, are arranged in that order from the upper side in FIG. 1. The secondary transfer roller 25 is arranged on the outer side of the intermediate transfer belt 24, and a recording material can pass between the secondary transfer roller 25 and the intermediate transfer belt 24.

Toner images in respective colors formed on the photosensitive drums 28Y, 28M, 28C, and 28K are transferred (primarily transferred) to the intermediate transfer belt 24 through the effect of primary transfer bias applied to the primary transfer rollers 23Y, 23M, 23C, and 23K at primary transfer portions (primary transfer nips) T1 where the photosensitive drums 28Y, 28M, 28C, and 28K respectively abut on the intermediate transfer belt 24. For example, when a full-color image in four colors is to be formed, toner images are sequentially transferred to the intermediate transfer belt 24 from a toner image formed on the photosensitive drum 28Y, so that a full-color toner image consisting of superimposed color layers of yellow, magenta, cyan, and black is formed on the intermediate transfer belt 24.

On the other hand, a recording material S stored in a cassette 110 serving as a recording material storage unit is conveyed to the transfer apparatus 2 via pick-up rollers 111 and registration rollers 112. The recording material S is conveyed to a secondary transfer portion (nip portion) T2 where the intermediate transfer belt 24 abuts on the secondary transfer roller 25 as a secondary transfer member, in synchronization with the toner image formed on the intermediate transfer belt 24. The toner image formed on the intermediate transfer belt 24 is then secondarily transferred onto the recording material S through the effect of secondary transfer bias applied to the secondary transfer roller 25 at the secondary transfer portion T2. The recording material S on which the toner image is transferred is pressurized and heated by the fixing apparatus 3. Through the above processing, toner applied to the recording material S is melted and mixed, and a color image is fixed onto the recording material S. Thereafter, the recording material S is discharged to the outside the image forming apparatus 100.

In a case where images are formed on both faces of the recording material S, the recording material S having passed through the fixing apparatus 3 is conveyed to a reversing conveyance path 113, and the front and back faces of the recording material S are reversed. Thereafter, the recording material S is conveyed to the registration rollers 112 through the conveyance rollers 114, and a toner image is similarly formed on the back face of the recording material S at the secondary transfer portion T2 through the processing described above. The toner image is then fixed onto the back face of the recording material S again by the fixing apparatus 3.

Sticking substances, such as toner, remaining on the photosensitive drums 28Y, 28M, 28C, and 28K after the primary transfer processing are collected by the cleaning apparatuses 26Y, 26M, 26C, and 26K, respectively. The photosensitive drums 28Y, 28M, 28C, and 28K are thereby ready for the next image forming processing. Further, sticking substances such as toner remaining on the intermediate transfer belt 24 after the second transfer processing are removed by an intermediate transfer belt cleaner 29.

The image forming apparatus 100 according to the present exemplary embodiment can also form a single-color image, such as a black-color image, or a multi-color image by using a single image forming unit of a desired color or some image forming units of desired colors from among the image forming units PY, PM, PC, and PK. In FIG. 1, the image forming units PY, PM, PC, and PK of respective colors are arranged in a vertical direction. However, the image forming units PY, PM, PC, and PK may be arranged in any direction, such as a horizontal direction or an oblique direction.

In the present exemplary embodiment, an outer diameter of the photosensitive drums 28Y, 28M, 28C, and 28K is 80 mm, and the photosensitive drums 28Y, 28M, 28C, and 28K execute image forming processing while rotating at a circumferential speed of 513 mm/sec, for example.

Developer storage units 27Y, 27M, 27C, and 27K are arranged to respectively correspond to the development apparatuses 1Y, 1M, 1C, and 1K. Then, in the order from the upper side in FIG. 1, bottles which store developer of corresponding colors, e.g., yellow, magenta, cyan, and black, are loaded on the developer storage unit 27Y, 27M, 27C, and 27K in a replaceable state. The developer storage units 27Y, 27M, 27C, and 27K can respectively convey (supply) developer to the development apparatuses 1Y, 1M, 1C, and 1K corresponding to the colors of stored developer.

For example, a toner weight ratio of developer stored in the bottle is 80 to 95%, and a toner weight ratio of developer within each of the development apparatuses 1Y, 1M, 1C, and 1K is 5 to 10%. When the development apparatuses 1Y, 1M, 1C, and 1K execute development to consume toner, developer which contains toner equivalent to the consumed toner is thereby supplied to the development apparatuses 1Y, 1M, 1C, and 1K, so that the toner weight ratio of developer within each of the development apparatuses 1Y, 1M, 1C, and 1K is maintained constant.

[Development Apparatus]

Figure 2:
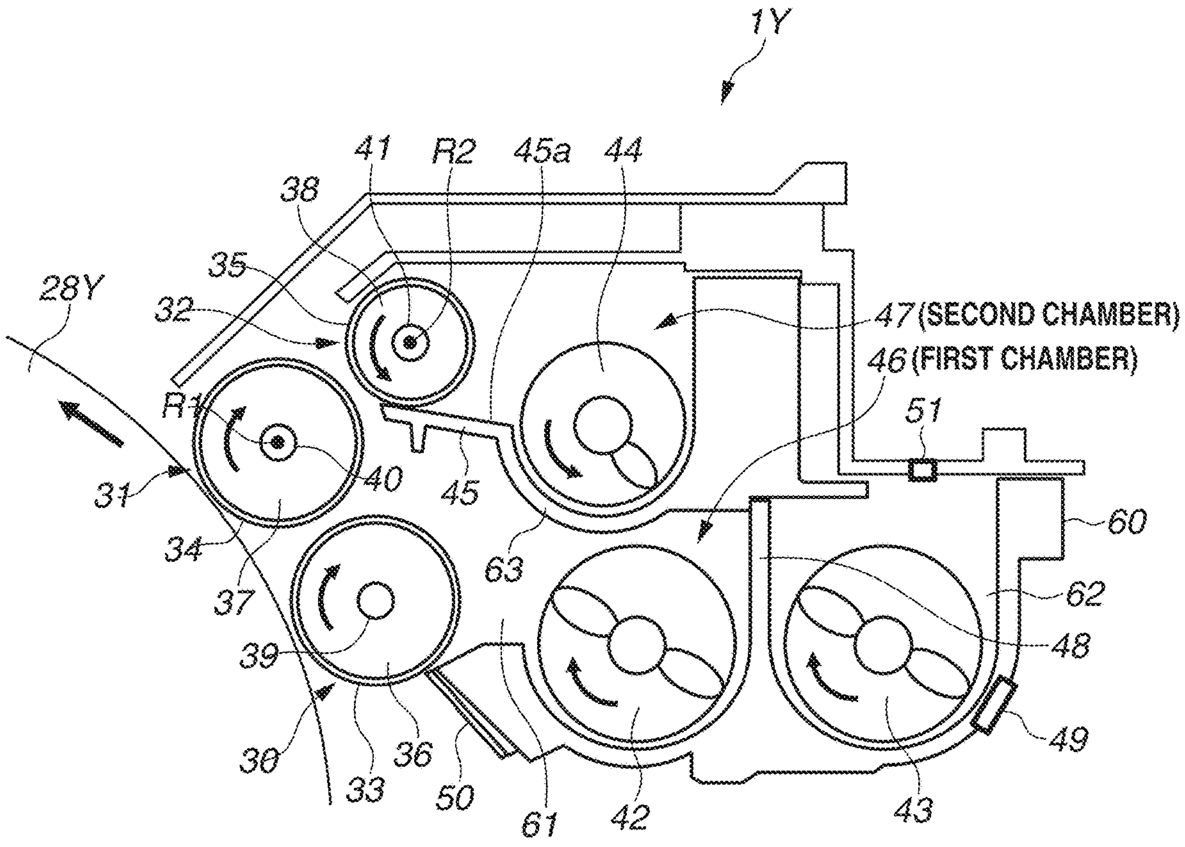
FIG. 2 is a cross-sectional diagram illustrating a schematic configuration of a development apparatus according to the first exemplary embodiment.

The development apparatuses 1Y, 1M, 1C, and 1K will now be described in detail with reference to FIG. 2. Configurations of the development apparatuses 1Y, 1M, 1C, and 1K are similar to each other. Thus, the development apparatus 1Y will be described as a representative example. As illustrated in FIG. 2, the development apparatus 1Y includes a first development roller (first rotating roller) 30, a second development roller (second rotating roller) 31, a separating roller 32, a developer supply screw 42, a developer agitation screw 43, and a developer collection screw 44. These members are stored in a development container 60. The development container 60 stores two-component developer which contains non-magnetic toner and magnetic carriers.

The first development roller 30 is a rotationally-driven developer bearing member. The first development roller 30 is arranged at a position adjacent to the photosensitive drum 28Y such that a rotation axis line of the first development roller 30 becomes substantially parallel to a rotation axis line of the photosensitive drum 28Y. The first development roller 30 includes a rotating first development sleeve 33 and a first magnet (first development stationary magnet) 36. The first magnet 36 is arranged inside the first development sleeve 33 in a non-rotating state and causes developer to be attracted to the surface of the first development sleeve 33 through a magnetic force. The first development roller 30 then attracts (bears) the developer scooped by the developer supply screw 42 through the magnetic force, and develops the electrostatic latent image formed on the rotating photosensitive drum (image bearing member) 28Y with the developer.

The first development sleeve 33 is a non-magnetic cylindrical member rotationally driven about a rotation axis 39. The first development sleeve 33 rotates in a clockwise direction indicated by an arrow in FIG. 2. In the present exemplary embodiment, a rotation direction of the first development sleeve 33 is opposite to a rotation direction of the photosensitive drum 28Y. Thus, the first development sleeve 33 and the photosensitive drum 28Y rotate in a same direction at a position (confronting position) where the first development sleeve 33 and the photosensitive drum 28Y confront each other. In other words, the first development sleeve 33 rotates such that a face of the first development sleeve 33 confronting the photosensitive drum 28Y moves upward from a lower side in the vertical direction.

The first magnet 36 is arranged inside the first development sleeve 33, and includes, for example, a plurality of fan-shaped magnetic pole portions and fan-shaped non-magnetic pole portions. A space which allows the first development sleeve 33 to rotate is arranged between an inner circumferential face of the first development sleeve 33 and an outer circumferential face of the first magnet 36.

The developer attracted to the first development sleeve 33 is conveyed toward the photosensitive drum 28Y through a rotational movement of the first development sleeve 33, and develops an electrostatic latent image formed on the photosensitive drum 28Y. After developing the electrostatic latent image formed on the photosensitive drum 28Y, the developer borne on the first development sleeve 33 is conveyed to a region in a vicinity of the second development roller 31 through a rotational movement of the first development sleeve 33. Through a magnetic field generated by the first magnet 36 arranged inside the first development roller 30 and a magnetic field generated by the second magnet 37 (second development stationary magnet) arranged inside the second development roller 31, the developer is then separated from the first development sleeve 33 and delivered onto the second development sleeve 34, in a vicinity of a position where the first development roller 30 comes closest to the second development roller 31.

The second development roller 31 serving as a development roller is a rotationally-driven developer bearing member. The second development roller 31 is arranged at a position on a downstream side of the first development roller 30 in a rotation direction of the photosensitive drum 28Y and on an upper side of the rotation center of the first development roller 30 in the vertical direction, and developer is delivered to the second development roller 31 from the first development roller 30 through a magnetic force. Similar to the first development roller 30, the second development roller 31 is arranged at a position adjacent to the photosensitive drum 28Y such that a rotation axis line of the second development roller 31 becomes substantially parallel to a rotation axis line of the photosensitive drum 28Y. Accordingly, the rotation axis lines of the second development roller 31 and the first development roller 30 are substantially parallel to each other.

The second development roller 31 includes a rotating second development sleeve 34 and the second magnet 37 that is arranged inside the second development sleeve 34 in a non-rotating state. The second magnet 37 causes developer to be attracted to the surface of the second development sleeve 34 through a magnetic force. The second development roller 31 then receives developer from the first development roller 30 (the first development sleeve 33) and attracts (bears) the developer through the magnetic force, and develops an electrostatic latent image formed on the rotating photosensitive drum 28Y with the developer. On one side of the second development roller 31, a separating roller 32 described below is located.

The second development sleeve 34 is a non-magnetic cylindrical member rotationally driven about a rotation axis 40. The second development sleeve 34 rotates in a clockwise direction indicated by an arrow in FIG. 2. In the present exemplary embodiment, a rotation direction of the second development sleeve 34 is opposite to a rotation direction of the photosensitive drum 28Y. The second development sleeve 34 and the photosensitive drum 28Y therefore rotate in a same direction at a position where the second development sleeve 34 and the photosensitive drum 28Y face each other. In other words, the second development sleeve 34 rotates such that a surface of the second development sleeve 34 facing the photosensitive drum 28Y moves upward from a lower side in the vertical direction. The second development sleeve 34 and the first development sleeve 33 rotate in the opposite directions at a position where the second development sleeve 34 and the first development sleeve 33 face each other.

The second magnet 37 is arranged inside the second development sleeve 34, and includes, for example, a plurality of fan-shaped magnetic pole portions and fan-shaped non-magnetic pole portions. A space which allows the second development sleeve 34 to rotate is arranged between an inner circumferential face of the second development sleeve 34 and an outer circumferential face of the second magnet 37.

The developer attracted to the second development sleeve 34 is conveyed toward the photosensitive drum 28Y through a rotational movement of the second development sleeve 34, and develops an electrostatic latent image formed on the photosensitive drum 28Y. After developing the electrostatic latent image formed on the photosensitive drum 28Y, the developer remaining in the second development sleeve 34 is conveyed to a region in a vicinity of the separating roller 32 through a rotational movement of the second development sleeve 34. Through a magnetic field generated by the second magnet 37 arranged inside the second development roller 31 and a magnetic field generated by a third magnet 38 (separating stationary magnet) arranged inside the separating roller 32, the developer is then delivered to the separating sleeve 35 arranged on the separating roller 32 from the second development sleeve 34 in a vicinity of a position where the second development roller 31 comes closest to the separating roller 32.

The separating roller 32 is arranged on one side of a rotation center R1 of the second development sleeve 34, opposite to another side where the photosensitive drum 28Y is located. The separating roller 32 separates developer from the second development roller 31 after the electrostatic latent image formed on the photosensitive drum 28Y is developed by the second development roller 31. Specifically, the separating roller 32 is a rotationally-driven developer bearing member arranged at a position between the second development roller 31 and the developer collection screw 44 such that a rotation center R2 of the separating roller 32 is located on the upper side of the rotation center R1 of the second development roller 31.

The separating roller 32 is arranged such that a rotation axis line of the separating roller 32 becomes substantially parallel to the rotation axis line of the second development roller 31. The above-described separating roller 32 includes a rotating separating sleeve 35 and the third magnet 38. The third magnet 38 is arranged inside the separating sleeve 35 in a non-rotating state and attracts developer to the surface of the separating sleeve 35 through a magnetic force. The separating roller 32 receives developer from the second development roller 31 through the magnetic force.

The separating sleeve 35 is a non-magnetic cylindrical member rotationally driven about a rotation axis 41.

The separating sleeve 35 rotates in a counterclockwise direction indicated by an arrow in FIG. 2. In the present exemplary embodiment, a rotation direction of the separating sleeve 35 is opposite to a rotation direction of the second development sleeve 34. Thus, the separating sleeve 35 and the second development sleeve 34 rotate in a same direction (forward direction) at a position (facing position) where the separating sleeve 35 and the second development sleeve 34 face each other.

The third magnet 38 is arranged inside the separating sleeve 35, and includes, for example, a plurality of fan-shaped magnetic pole portions and fan-shaped non-magnetic pole portions. A space which allows the separating sleeve 35 to rotate is arranged between an inner periphery of the separating sleeve 35 and an outer periphery of the third magnet 38.

The developer absorbed to the separating sleeve 35 is conveyed to a downstream side in the rotation direction through a rotational movement of the separating sleeve 35. At a position where the developer comes close to the developer collection screw 44, the developer is separated from the separating sleeve 35 through the third magnet 38 arranged inside the separating roller 32, and falls down toward a guide member 45 located on the lower side in the vertical direction by its own weight. The developer that has fallen onto the guide member 45 is then guided toward the developer collection screw 44 by its own weight.

The guide member 45 and the developer collection screw 44 constitute a developer collection unit 47 serving as a collection unit for collecting the developer separated from the separating sleeve 35 arranged on the separating roller 32. The developer collection screw 44 is arranged in the developer collection unit 47 at a position lower than a rotation center R2 of the separating roller 32 in the vertical direction, and the developer collection screw 44 agitates and conveys the developer collected and received from the separating roller 32.

The guide member 45 serving as a guide unit is arranged on the lower side of the rotation center R2 of the separating roller 32 in the vertical direction, and guides the developer separated by the separating roller 32 toward the developer collection screw 44. In order to guide the separated developer toward the developer collection screw 44 more reliably, the guide member 45 has an inclined face 45*a* which makes the developer slide down by its own weight. The inclined face 45*a* is horizontally inclined such that the developer collection screw 44 is located at a position lower than the separating roller 32.

The developer collection screw 44 serving as a collection member as well as a conveyance unit conveys collected developer to a developer circulation unit 46 described below. In other words, the developer collection screw 44 is a screw conveyance member used for conveying the collected developer sliding down the inclined face 45*a* of the guide member 45 in one direction while agitating the developer.

The developer circulation unit 46 is a supply unit for supplying developer to the first development roller 30. The developer circulation unit 46 includes a regulation member 50, a developer supply screw 42, and a developer agitation screw 43. At the developer circulation unit 46, developer is conveyed in a substantially horizontal direction while being agitated by the developer supply screw 42 and the developer agitation screw 43, and supplied to the first development roller 30. As described above, developer collected by the developer collection unit 47 falls downward by its own weight, and is introduced to the developer circulation unit 46. In other words, the developer circulation unit 46 is located on the lower side of the developer collection unit 47 in the vertical direction.

The developer supply screw 42, the developer agitation screw 43, and the developer collection screw 44 are conveyance screw members for conveying developer in one direction while agitating the developer. The developer supply screw 42 and the developer agitation screw 43 are located at positions lower than the rotation center of the developer collection screw 44 in the vertical direction. The developer supply screw 42, the developer agitation screw 43, and the developer collection screw 44 are arranged such that rotation axis lines thereof are also substantially parallel to each other. The rotation axis lines of these screws 42, 43, and 44 are also substantially parallel to the rotation axis line of the first development roller 30.

The developer supply screw 42 is located at a position between the first development roller 30 and the developer agitation screw 43, and a partition wall 48 of the development container 60 is arranged between the developer supply screw 42 and the developer agitation screw 43. The partition wall 48 of the development container 60 is arranged to extend in a direction parallel to the rotation axis lines of the developer supply screw 42 and the developer agitation screw 43. On the partition wall 48, communication openings for making a first conveyance path 61 and a second conveyance path 62 communicate are arranged. The developer supply screw 42 conveys developer to the first conveyance path 61, and the developer agitation screw 43 conveys developer to the second conveyance path 62.

The developer agitated by the developer collection screw 44 falls down by its own weight, toward the developer supply screw 42 via a communication opening formed on another partition wall 63 of the development container 60 located between the developer collection screw 44 and the developer supply screw 42. The above-described guide member 45 is formed integrally with the another partition wall 63, and the developer collection screw 44 is arranged on the upper side of the another partition wall 63.

The communication opening, through which developer agitated by the developer collection screw 44 is introduced to the developer circulation unit 46 after falling downward by its own weight, may be arranged at a position outside of a region where developer is supplied toward the first development roller 30 (i.e., a position outside of an intermediate portion of the developer supply screw 42 in the rotation axis line direction). In the present exemplary embodiment, the communication opening is located at a position included within a range of a downstream end portion (terminal end portion) in the developer conveyance direction of the first conveyance path 61 on which the developer supply screw 42 is arranged.

The developer supply screw 42 and the developer agitation screw 43 convey developer in the opposite directions. Then, a beginning end (i.e., an upstream end in the developer conveyance direction) and a terminal end (i.e., a downstream end in the developer conveyance direction) of the first conveyance path 61 where the developer supply screw 42 is arranged respectively communicate with a terminal end and a beginning end of the second conveyance path 62 where the developer agitation screw 43 is arranged via the communication openings formed on the partition wall 48. Accordingly, developer circulates in the rotation directions of the developer supply screw 42 and the developer agitation screw 43 indicated by the arrow in FIG. 2, and also circulates in the substantially horizontal direction within the development container 60, and a part of the developer is supplied to the first development roller 30.

A developer supply port 51 (see FIG. 2) is arranged on the development container 60 at a position on the upper side of the developer agitation screw 43 and coupled to the developer storage unit 27Y (see FIG. 1). Developer stored in the bottle loaded on the developer storage unit 27Y can then be supplied to the second conveyance path 62 where the developer agitation screw 43 is arranged, via the developer supply port 51.

As described above, since a toner weight ratio of developer stored in the bottle loaded on the developer storage unit 27Y is greater than a toner weight ratio of developer within the development apparatus 1Y, the toner weight ratio of the developer within the development apparatus 1Y can be maintained constant by adjusting the developer supplied to the developer agitation screw 43.

A toner concentration detection sensor 49 (see FIG. 2) is arranged in order to detect concentration of toner within the developer included in the developer circulation unit 46. The toner concentration detection sensor 49 detects magnetic permeability of developer. The toner concentration is used when developer supplied from the developer storage unit

27Y is controlled in order to cope with consumption of toner within the development apparatus 1Y. For example, developer is supplied from the developer storage unit 27Y when toner concentration lower than a predetermined value is detected. The toner concentration can be detected by using magnetic permeability because the magnetic permeability of developer is changed depending on the toner concentration.

The regulation member 50 is arranged next to the first development roller 30 and used for regulating the amount of developer supplied to the first development roller 30 from the developer circulation unit 46. For example, the amount of developer attracted to the development roller 30 can be regulated by the regulation member 50 based on a gap between the surface of the first development sleeve 33 arranged on the first development roller 30 and an end portion of the regulation member 50.

Developer within the development container 60 is circulated through the following circulation path. In other words, developer within the development container 60 is conveyed in the substantially horizontally direction while being agitated by the developer circulation unit 46, supplied to the first development roller 30, and delivered to the second development roller 31 located on the upper side of the first development roller 30 from the development roller 30 through magnetic force. Then, from the second development roller 31, developer is delivered to the separating roller 32 located on one side of the second development roller 31 again through the magnetic force. Thereafter, developer is separated from the separating roller 32 by the third magnet 38 arranged inside the separating roller 32, collected by the developer collection unit 47, and introduced to the developer circulation unit 46 again.

In the above-described present exemplary embodiment, a two-component development method is employed as a development method, and developer composed of a mixture of non-magnetic toner having negative charging polarity and magnetic carriers is used. The non-magnetic toner is made of polyester resin or styrene-acrylic resin containing coloring materials and wax, which is pulverized or polymerized into powder, with addition of fine oxidized titanium powder or fine silica powder on a surface of the powder. A magnetic carrier includes a core material made of resin particles mixed and kneaded with ferrite particles and magnetic powder, whose surface layer is coated with resin. In the present exemplary embodiment, toner concentration of developer (i.e., a weight ratio of toner contained in the developer) is 8% in the initial state.

Typically, the two-component development method using toner and carriers electrically charges toner and carriers with predetermined polarities by making toner and carriers frictionally contact with each other. Thus, the stress applied to toner is less than the stress applied to toner through a single-component development method using single-component developer. In contrast, when developer is used for a long period of time, dirt (spent substance) adhered to the surface of the carrier increases, so that ability to charge toner is lowered gradually. As a result, problems such as fogging and scattering of toner occur in conventional systems.

A lifetime of two-component developer can be prolonged by increasing the amount of developer stored in the development apparatus. However, this method is not desirable because the development apparatus is increased in size.

In order to resolve the above-described issue related to the two-component developer, an auto carrier refresh (ACR) method is employed in the present exemplary embodiment. The ACR method is a method for suppressing the increase in degraded carriers by gradually supplying new developer to the development apparatus 1Y from the developer storage unit 27Y while gradually discharging developer having degraded charging performance from a discharge port of the development apparatus 1Y. Through the above-described method, degraded carriers within the development apparatus 1Y are gradually replaced with new carriers, so that charging performance of the carriers within the development apparatus 1Y can be maintained at a substantially constant level.

The development apparatus 1Y according to the present exemplary embodiment supplies developer within the first conveyance path 61 to the first development sleeve 33 through the developer supply screw 42. The first magnet 36 then generates a magnetic field which causes the first development sleeve 33 to bear a predetermined amount of supplied developer, so that a puddle of developer is formed on the first development sleeve 33. Through the rotation of the first development sleeve 33, the puddle of two-component developer formed on the first development sleeve 33 passes through the regulation member 50, so as to be thinly layered and coated on the surface of the first development sleeve 33, and conveyed to a development region facing the photosensitive drum 28Y. The developer borne on the first development sleeve 33 rises and forms magnetic ears in the development region.

In a first development region where the first development sleeve 33 faces the photosensitive drum 28Y, an electrostatic latent image formed on the photosensitive drum 28Y is visualized with a development bias applied to the first development sleeve 33. In the present exemplary embodiment, although a bias having a superimposed waveform of an alternating electric field and a direct electric field is applied to the first development sleeve 33 as the development bias, the development bias by only a direct electric field can also be applied.

After the two-component developer is used for the development processing in the first development region, the two-component developer is delivered to the second development sleeve 34 at a position where the first development sleeve 33 comes close to the second development sleeve 34, so that the developer is conveyed to a second development region where the second development sleeve 34 faces the photosensitive drum 28Y. In the second development region, the development bias same as the development bias applied in the first development region is applied to the second development sleeve 34, and a toner image is uniformly adjusted by supplying and developing toner deficient for the potential of the electrostatic latent image formed on the photosensitive drum 28Y while collecting toner having been developed excessively. Herein, as the development biases applied to the first development sleeve 33 and the second development sleeve 34, biases of different waveforms may respectively be applied thereto.

Then, the developer having passed through the second development region is separated off in a region where the separating magnetic field is formed by the second magnet 37 arranged inside the second development sleeve 34. The developer separated from the second development sleeve 34 is absorbed to the surface of the separating sleeve 35 through the magnetic field formed by the third magnet 38 arranged inside the separating sleeve 35 arranged on the separating roller 32, and the developer is conveyed in a direction along the rotation direction of the separating sleeve 35. Through the separating magnetic field formed by the third magnet 38, the developer is removed from the surface of the separating sleeve 35 and collected by the developer collection unit 47.

In order to form an image with high image resolution and high image quality by using the above-described development apparatus 1Y, it is desired to thoroughly deliver the developer to the separating sleeve 35 from the second development sleeve 34. If developer cannot thoroughly be delivered, the developer falls downward in the vertical direction from a space between the second development sleeve 34 and the development container 60. If this happens, the developer falls onto the first development sleeve 33 and directly supplied to the first development sleeve 33 through the first conveyance path 61 without being agitated through the circulation path. Developer also falls downward to a space between the first development sleeve 33 and the second development sleeve 34, so that the developer is conveyed and dragged round by the second development sleeve 34 and directly supplied to the second development region. If this happens, developer ununiformly containing toner is used for the development processing, so that variation occurs in the concentration.

The above-described phenomenon is likely to occur when the image forming speed (process speed) is fast, i.e., when the rotation speeds of the first development sleeve 33, the second development sleeve 34, and the separating sleeve 35 are fast. Thus, the second development sleeve 34 and the separating sleeve 35 have to possess appropriate developer conveyance capabilities.

In a case where the developer conveyance capability possessed by the second development sleeve 34 is improved, whereas the developer conveyance capability possessed by the separating sleeve 35 is not sufficient in contrast to the developer conveyance capability possessed by the second development sleeve 34, a part of the developer conveyed by the second development sleeve 34 falls down in the vertical direction without being attracted by the third magnet 38 arranged inside the separating sleeve 35, after the developer is released from attraction of the magnet in the region where the separating magnetic field is formed by the second magnet 37.

In the present exemplary embodiment, the first development sleeve 33 operates at a circumferential speed of 513 mm/sec., the same as the circumferential speed of the photosensitive drum 28Y. The second development sleeve 34 operates at 616 mm/sec., and the separating sleeve 35 operates at 740 mm/sec.

[Surface Constitution of Second Development Sleeve and Separating Sleeve]

In the present embodiment, occurrence of a dragging phenomenon of developer is suppressed by optimizing the surface shapes of the second development sleeve 34 and the separating sleeve 35. The surface shapes of the second development sleeve 34 and the separating sleeve 35 will be described.

Recently, two types of methods, i.e., a method for adding a rough texture to the surface through blasting processing and a method for forming a groove shape on the surface through cutting or etching processing, have been mainly known as surface processing methods for improving the developer conveyance capability of an image bearing member such as the second development sleeve 34. In the former processing method employing blasting processing, a fine concavo-convex texture is created on a surface of a base pipe, such as an aluminum pipe, by uniformly blowing fine abrasive particles, such as alundum, onto the surface through the air compressed by a compressor. A surface shape of the second development sleeve 34 created by the blasting processing is managed by mainly using roughness indexes such as the ten-point average roughness Rz, the arithmetic average roughness Ra, and the average interval Sm (an average interval between a concavity and a convexity).

Figure 3:
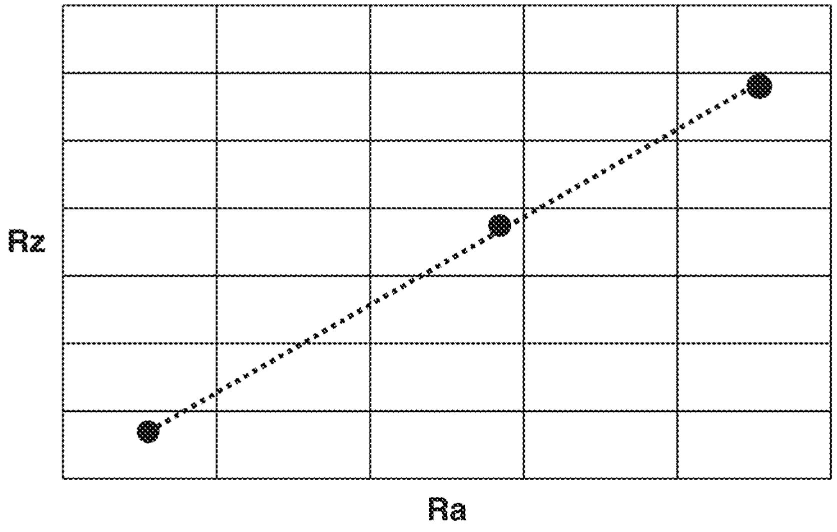
FIG. 3 is a graph illustrating a characteristic of surface roughness.

In the present exemplary embodiment, the surface roughness Rz and Ra are measured based on the Japanese Industrial Standards (JIS) 94 by using a surface roughness measuring instrument SE600 manufactured by Kosaka Laboratory Ltd. As a result of measuring the surface roughness Rz and Ra through the above-described surface roughness measuring instrument, the surface roughness Rz and Ra linearly correlate with each other as illustrated in FIG. 3, and the roughness indexes may have a similar relationship. Thus, in the present exemplary embodiment, only the surface roughness Rz is used as the roughness index, whereas the same can also be said for the case where the surface roughness Ra is used as the roughness index.

A developer conveyance capability possessed by the second development sleeve 34 is affected not only by the rotation speed of the second development sleeve 34 but also by the surface roughness of the second development sleeve 34. The amount of developer delivered from the first development sleeve 33 to the second development sleeve 34 is determined depending on the developer conveyance capability possessed by the first development sleeve 33. Similar to the case of the second development sleeve 34, the developer conveyance capability possessed by the first development sleeve 33 is affected by the rotation speed and the surface roughness of the first development sleeve 33. However, an amount of developer appropriate for the development processing can be supplied to the first and the second development regions by adjusting a width of a gap between the first development sleeve 33 and the regulation member 50.

In a case where the separating sleeve 35 does not possess the sufficient developer conveyance capability when developer is to be delivered to the separating sleeve 35 from the second development sleeve 34, developer which cannot be received by the separating sleeve 35 passes through a space between the second development sleeve 34 and the separating sleeve 35. Then, the developer is removed from the second development sleeve 34 in the region where the separating magnetic field is formed by the second magnet 37, and falls downward in the vertical direction. There is a case where a part of the developer removed from the second development sleeve 34 scatters toward a space between the second development sleeve 34 and the first development sleeve 33 because of a conveyance force in a tangential direction applied from the second development sleeve 34. Thus, the separating sleeve 35 has to possess a certain level of developer conveyance capability in contrast to the developer conveyance capability possessed by the second development sleeve 34.

In the present exemplary embodiment, each of the second development sleeve 34 and the separating sleeve 35 has a concavo-convex surface. This concavo-convex shape is formed by the blasting processing. When the ten-point average roughness of the surface of the second development sleeve 34 is Rz1 and the ten-point average roughness of the surface of the separating sleeve 35 is Rz2, based on satisfying Equations (1) and (2), set forth below:

$$0.35 \times Rz1 \leq Rz2 \qquad (1)$$

$$7\ \mu\text{m} \leq Rz1 \leq 15\ \mu\text{m} \qquad (2)$$

FIGS. 4A and 4B are tables illustrating a relationship that occurs with the above-described dragging phenomenon of developer when the surface roughness Rz1 of the second development sleeve 34 and the surface roughness Rz2 of the separating sleeve 35 were applied. This evaluation was conducted on the dragging phenomenon when the above-described process speed was a predetermined process speed (when a circumferential speed of the photosensitive drum 28Y was 513 mm/sec.), and the dragging phenomenon when the predetermined process speed was increased by 10% (when the circumferential speed of the photosensitive drum 28Y was 564.3 mm/sec.).

When the circumferential speed of the photosensitive drum 28Y was increased, an overall operation speed of the development apparatus 1Y, i.e., the operation speed of each of the first development sleeve 33 and the second development sleeve 34, was also set to a speed 10% higher than the overall operation speed of the development apparatus 1Y when the circumferential speed of the photosensitive drum 28Y was a predetermined process speed. In each of the tables illustrated in FIGS. 4A and 4B, a symbol "○" indicates that the dragging phenomenon did not occur, a symbol "Δ" indicates that a sign of behavior causing the dragging phenomenon was observed but an influence on an image was not observed, and a symbol "x" indicates that the dragging phenomenon occurred.

FIG. 4A illustrates occurrence/non-occurrence of the dragging phenomenon when conditions of the surface roughness Rz1 of the second development sleeve 34 and conditions of the surface roughness Rz2 of the separating sleeve 35 were combined at a predetermined process speed. At the predetermined process speed, it was found that the dragging phenomenon did not occur in any of the combinations.

FIG. 4B illustrates occurrence/non-occurrence of the dragging phenomenon when conditions of the surface roughness Rz1 of the second development sleeve 34 and conditions of the surface roughness Rz2 of the separating sleeve 35 were combined at a process speed increased by 10% from the predetermined process speed. In the table illustrated in FIG. 4B, a symbol "♦" indicates occurrence of a fusion bond phenomenon of toner onto the surface of the second development sleeve 34.

Typically, a development sleeve having the surface roughness Rz of around 7 to 15 μm is used for the image forming apparatus employing an electrophotographic method. Thus, the second development sleeves 34 having the surface roughness of approximately 7, 9, 11, and 15 μm were prepared. In contrast, the separating sleeve 35 having the surface roughness of 16.5 μm, which was 10% greater than the surface roughness Rz1 of the second development sleeve 34, was prepared, and the surface roughness Rz2 was changed by gradually flattening and smoothing the surface by using an abrasive sheet. Then, as illustrated in FIGS. 4A and 4B, an evaluation was conducted, and occurrence of the dragging phenomenon was checked by changing the combination of the surface roughness Rz1 and Rz2.

As illustrated in FIG. 4B, in a case where the process speed was faster than the predetermined process speed, the dragging phenomenon began to occur when the surface roughness Rz2 of the separating sleeve 35 was less than or equal to 30% of the surface roughness Rz1 of the second development sleeve 34, and the dragging phenomenon tended to occur less frequently when the surface roughness Rz2 of the separating sleeve 35 was equivalent to 35% of the surface roughness Rz1 of the second development sleeve 34.

In contrast, in a case where the surface roughness Rz1 of the second development sleeve 34 and the surface roughness Rz2 of the separating sleeve 35 were increased, conveyance performance of the magnetic ears became too high. Thus, frictional force was increased at a position where the second development sleeve 34 and the separating sleeve 35 face each other, and the fusion bond phenomenon of toner was observed on the respective surfaces of the second development sleeve 34 and the separating sleeve 35.

The fusion bond phenomenon occurred at a position where the second development sleeve 34 and the separating sleeve 35 faced each other and developer began to accumulate and stagnated. When the fusion bond phenomenon occurred on the surface of the second development sleeve 34, the surface roughness Rz tended to be greater at a portion of the fusion bond. Thus, the amount of developer conveyed to the second development region was increased, and the concentration was increased at only a portion of the fusion bond. As a result, toner borne on the photosensitive drum 28Y was developed while smudging the electrostatic latent image to cause image defect to occur.

According to the present exemplary embodiment, it is desirable that the surface roughness Rz2 of the separating sleeve 35 satisfies Equation (1), above, i.e., $0.35 \times Rz1 \leq Rz2$. However, it is desirable that a maximum value of the surface roughness Rz1 be 15 μm. It is also desirable that a minimum value of the surface roughness Rz1 be 7 μm. It is thus desirable that Equation (2), i.e., $7\ \mu m \leq Rz1 \leq 15\ \mu m$, be also satisfied.

From the result illustrated in FIG. 4B, it is desirable that the surface roughness Rz1 and Rz2 satisfy a formula of $0.40 \times Rz1 \leq Rz2$. Further, it is more desirable that the surface roughness Rz1 and Rz2 satisfy a formula of $Rz2 \leq 1.20 \times Rz1$. It is much more desirable that the surface roughness Rz1 and Rz2 satisfy a formula of $Rz2 \leq 1.00 \times Rz1$.

In the present exemplary embodiment, the second development sleeve 34 and the separating sleeve 35 have the concavo-convex surfaces as described above. With this configuration, the developer conveyance capabilities possessed by the respective sleeves 34 and 35 can be improved. As a result, it is possible to suppress occurrence of the dragging phenomenon of developer in the second development sleeve 34 to suppress occurrence of image failure. Further, in the present exemplary embodiment, a relationship between the surface roughness Rz1 of the second development sleeve 34 and the surface roughness Rz2 of the separating sleeve 35 is specified as described above. In this way, it is possible to further suppress occurrence of the dragging phenomenon of developer. Occurrence of the dragging phenomenon can also be suppressed even in a case where the process speed is increased substantially, it is thus possible to provide an image forming apparatus that produces high-quality images.

According to the present exemplary embodiment, the circumferential speed of the second development sleeve 34 is set to 616 mm/sec., whereas the circumferential speed of the separating sleeve 35 is set to 740 mm/sec., which is faster than the circumferential speed of the second development sleeve 34. In this way, the developer conveyance capability possessed by the separating sleeve 35 can be increased, so that the developer collection capability of the separating sleeve 35 is improved. It is thereby possible to suppress a fall of developer separated from the second development sleeve 34.

Figure 5:
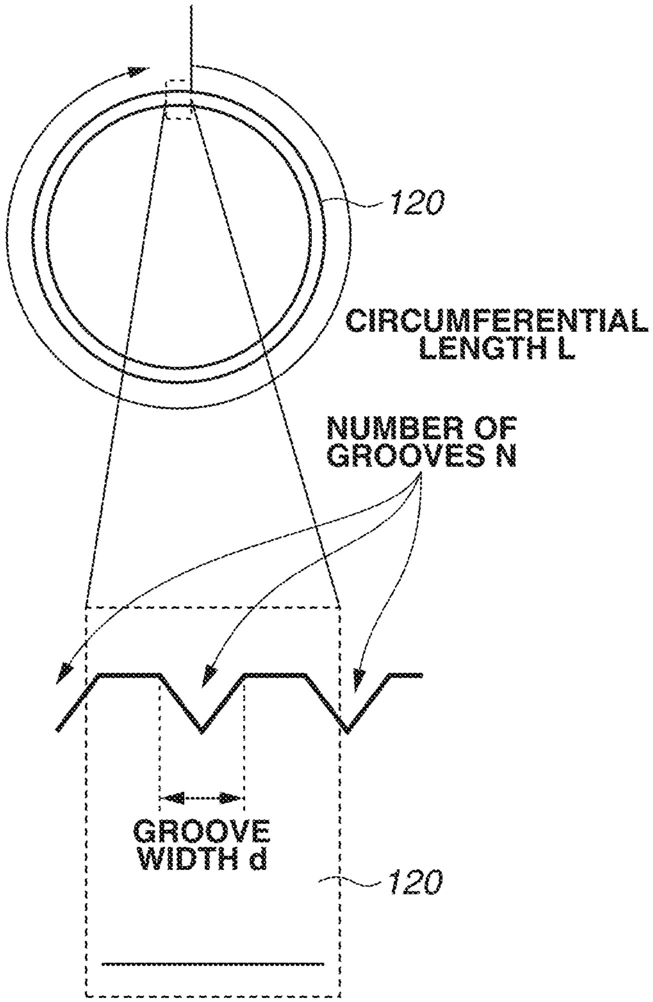
FIG. 5 is a diagram illustrating a groove ratio according to a second exemplary embodiment.

A second exemplary embodiment will now be described with reference to FIGS. 5 and 6B while referring to FIG. 2.

In the above-described first exemplary embodiment, the concavo-convex surfaces of the second development sleeve 34 and the separating sleeve 35 are formed by the blasting processing. In contrast, in the present exemplary embodiment, the concavo-convex surfaces of the second development sleeve 34 and the separating sleeve 35 are formed by forming a plurality of grooves arranged in the circumferential direction. The other configurations and operations are similar to those described in the first exemplary embodiment. And thus, illustration and description are omitted or simplified with respect to the configurations similar to those of the first exemplary embodiment, and the points different from the first exemplary embodiment will mainly be described.

In recent years, it has been often the case that a development apparatus arranged on the electrophotographic image forming apparatus includes a development sleeve having a surface on which a plurality of grooves whose cutting cross-sectional faces are uniform in a longitudinal direction is arranged in a circumferential direction. Generally, as a processing method of the above-described grooves, there is provided one method using an etching solution. In this method, a non-grooved portion of a base pipe is coated with resist, and grooves are formed by blowing the etching solution onto a grooved portion and making a metallic material be corroded and melted. There is also provided another method for forming grooves by executing extrusion processing or drawing processing on a base pipe after a mold having a blade is attached to a grooved portion of the base pipe. The grooves formed on the surface of the sleeve through the above-described methods are managed by using an index, such as a groove ratio calculated from a groove width, the number of grooves, and a circumferential length of the sleeve.

In the present exemplary embodiment, the sleeves having the groove shape formed through the latter method employing the extrusion processing are used as the first development sleeve 33, the second development sleeve 34, and the separating sleeve 35. Basically, a result substantially similar to the below-described example can be acquired even if a groove shape is formed through a different groove forming method.

In the present exemplary embodiment, the concavo-convex surfaces of the second development sleeve 34 and the separating sleeve 35 have a shape formed of a plurality of grooves arranged in a circumferential direction (hereinafter, also called "grooved shape"). As illustrated in FIG. 5, a groove ratio $\rho$ is defined by Equation (3), set forth below:

$$\rho = (d \times N)/L \tag{3}$$

where d is a width of a groove 121 formed on a sleeve, N is the number of grooves per circumference, and L is a circumferential length.

Equations (4) and (5), set forth below, are then satisfied:

$$0.40 \times \rho 1 \leq \rho 2, \tag{4}$$

$$0.07 \leq \rho 1 \leq 0.23, \tag{5}$$

where $\rho 1$ is a groove ratio of the surface of the second development sleeve 34, and $\rho 2$ is a groove ratio of the surface of the separating sleeve 35. In other words, in the present exemplary embodiment, a groove ratio $\rho$ is used as an index for expressing a relationship between a surface shape and a developer conveyance capability possessed by the sleeve having a grooved surface.

Similar to the case of the surface roughness Rz described in the first exemplary embodiment, a developer conveyance capability possessed by a sleeve having a grooved surface is changed depending on the magnitude of the grave ratio $\rho$. The developer conveyance capability is high when the groove ratio $\rho$ is large, and the developer conveyance capability is low when the groove ratio $\rho$ is small. As illustrated in FIG. 5, in the present exemplary embodiment, a sleeve is used that has a grooved surface whose cross-sectional face orthogonal to a rotation axis line direction is a V-shape. However, a developer conveyance capability possessed by a sleeve having a U-shape grooved surface or a trapezoidal-shape grooved surface can similarly be expressed by the groove ratio. If the grooves have constant shapes, a groove depth is determined uniformly when a groove width is determined because the grooves have similarity shapes. Even if the grooves do not have the constant shapes, a groove ratio can be calculated depending on a cross-sectional position of a cylindrical sleeve.

FIGS. 6A and 6B are tables illustrating results of a relationship that occurs with the above-described dragging phenomenon of developer when a groove ratio $\rho$ was applied in a similar way as the surface roughness Rz described in the first exemplary embodiment. This evaluation was also conducted on the dragging phenomenon when the above-described process speed was a predetermined process speed (when a circumferential speed of the photosensitive drum 28Y was 513 mm/sec.) and when the predetermined process speed was increased by 10% (when the circumferential speed of the photosensitive drum 28Y was 564.3 mm/sec.).

When the circumferential speed of the photosensitive drum 28Y was increased, an overall operation speed of the development apparatus 1Y, such as the operation speed of each of the first development sleeve 33 and the second development sleeve 34, was also set to a speed 10% higher than the overall operation speed of the development apparatus 1Y when the circumferential speed of the photosensitive drum 28Y was a predetermined process speed. In each of the tables illustrated in FIGS. 6A and 6B, a symbol "○" indicates that the dragging phenomenon did not occur, a symbol "Δ" indicates that a sign of behavior causing the dragging phenomenon was observed but an influence on an image was not observed, and a symbol "x" indicates that the dragging phenomenon occurred.

FIG. 6A illustrates occurrence/non-occurrence of the dragging phenomenon when conditions of the groove ratio $\rho 1$ of the second development sleeve 34 and conditions of the groove ratio $\rho 2$ of the separating sleeve 35 were combined at a predetermined process speed. FIG. 6B illustrates occurrence/non-occurrence of the dragging phenomenon when conditions of the groove ratio $\rho 1$ of the second development sleeve 34 and conditions of the groove ratio $\rho 2$ of the separating sleeve 35 were combined at a process speed increased by 10% from the predetermined process speed. In each of the tables illustrated in FIGS. 6A and 6B, a horizontal column describes the groove ratio $\rho 1$ of the second development sleeve 34, and a vertical column describes a ratio of the groove ratio $\rho 2$ of the separating sleeve 35 to the groove ratio $\rho 1$ of the second development sleeve 34.

In a case where the groove ratio $\rho 1$ of the second development sleeve 34 was 0.06 or less, the developer conveyance capability used to convey the two-component developer could hardly be acquired, and the developer conveyance capability was almost the same as a developer conveyance capability possessed by a cylindrical member having a non-grooved specular-surface. Further, in a case where the groove ratio $\rho1$ was greater than 0.23, a developer retaining capability became high at the grooved portion, so that the dragging phenomenon was likely to occur regardless of the rotation speed of the second development sleeve 34. Therefore, regardless of a relationship between the second development sleeve 34 and the separating sleeve 35, it is desirable that the groove ratio $\rho1$ of the second development sleeve 34 satisfies $0.07 \le \rho1 \le 0.23$.

In the present exemplary embodiment, based on the optimum range of the groove ratio described above, the groove ratio $\rho1$ of the second development sleeve 34 is set to 0.15 ($\rho1=0.15$). In the present exemplary embodiment, in order to supply the same amount of developer to the first and the second development regions, the first development sleeve 33 has a surface shape the same as a surface shape of the second development sleeve 34. Practically, a combination of sleeves having different surface shapes may also be employed depending on a development characteristic in a development region.

As illustrated in FIG. 6B, in a case where both of the second development sleeve 34 and the separating sleeve 35 have grooved surfaces, it is desirable that the groove ratio $\rho2$ of the separating sleeve 35 satisfies $0.40 \times \rho1 \le \rho2$, and it is more desirable that the groove ratio $\rho2$ also satisfies $\rho2 \le 1.67 \times \rho1$.

In other words, it is desirable that the groove ratio $\rho1$ of the second development sleeve 34 and the groove ratio $\rho2$ of the separating sleeve 35 satisfy $0.40 \times \rho1 \le \rho2 \le 1.67 \times \rho1$ and $0.07 \le \rho1 \le 0.23$.

From the result illustrated in FIG. 6B, it is desirable that the groove ratio $\rho1$ and the groove ratio $\rho2$ satisfy $0.53 \times \rho1 \le \rho2$. It is also more desirable that the groove ratio $\rho1$ and the groove ratio $\rho2$ satisfy $1.00 \times \rho1 \le \rho2$, and it is much more desirable that the groove ratio $\rho1$ and the groove ratio $\rho2$ satisfy $\rho2 \le 1.60 \times \rho1$.

In a case where the sleeve has a grooved surface, sizes of the concavities and convexities are larger than sizes of the concavities and convexities formed through the blasting processing, and not many concavities and convexities are in size easily catching and dragging toner. Thus, a fusion bond is less likely to occur. Thus, an upper limit and a lower limit of the groove ratio are determined depending on occurrence or non-occurrence of the dragging phenomenon of developer. In the present exemplary embodiment, occurrence of the dragging phenomenon is suppressed even in a case where the process speed is increased substantially by setting a relationship between the groove ratio $\rho1$ of the second development sleeve 34 and the groove ratio $\rho2$ of the separating sleeve 35 as described above. This makes it possible to provide an image forming apparatus that produces high-quality images.

A third exemplary embodiment is described with reference to FIGS. 7A and 9B while referring to FIG. 2. In the first exemplary embodiment described above, the concavo-convex shape is formed on the surfaces of the second development sleeve 34 and the separating sleeve 35 through the blasting processing. In the second exemplary embodiment, the concavo-convex shape is formed on the surfaces of each of the sleeves by forming grooves. In contrast, in the third exemplary embodiment, the second development sleeve 34 having any one of a concavo-convex surface formed by the blasting processing and a grooved surface is combined with the separating sleeve 35 having another one of the concavo-convex surface formed by the blasting processing and the grooved surface. The other configurations and operations are similar to those described in the first and the second exemplary embodiments. Illustration and description are therefore omitted or simplified with respect to the configuration similar to those of the first and the second exemplary embodiments, and the points different from the first and the second exemplary embodiments will be mainly described.

In the present exemplary embodiment, a combination of the second development sleeve 34 having a concavo-convex surface formed by the blasting processing and the separating sleeve 35 having a grooved surface, and a combination of the second development sleeve 34 having a grooved surface and the separating sleeve 35 having a concavo-convex surface formed by the blasting processing will be described respectively.

Figure 7A:
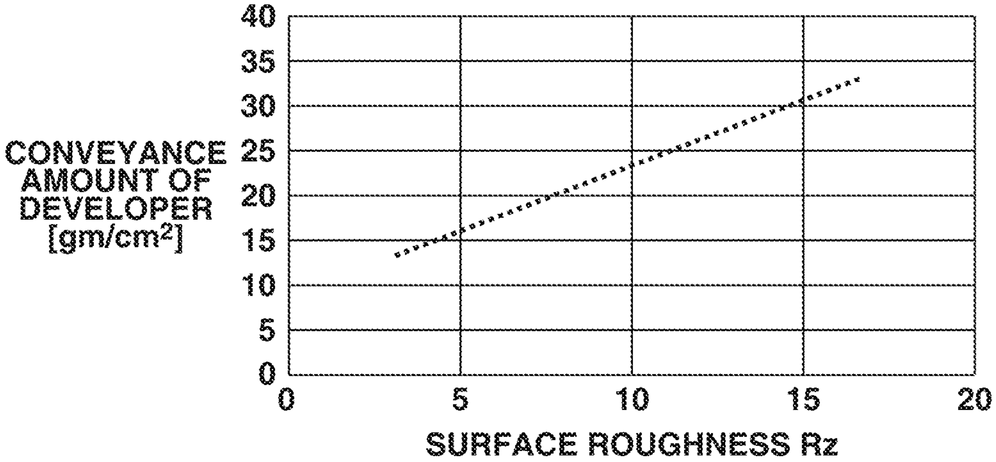
FIG. 7A is a graph illustrating a relationship between surface roughness Rz of a sleeve and a conveyance amount of developer.
Figure 7B:
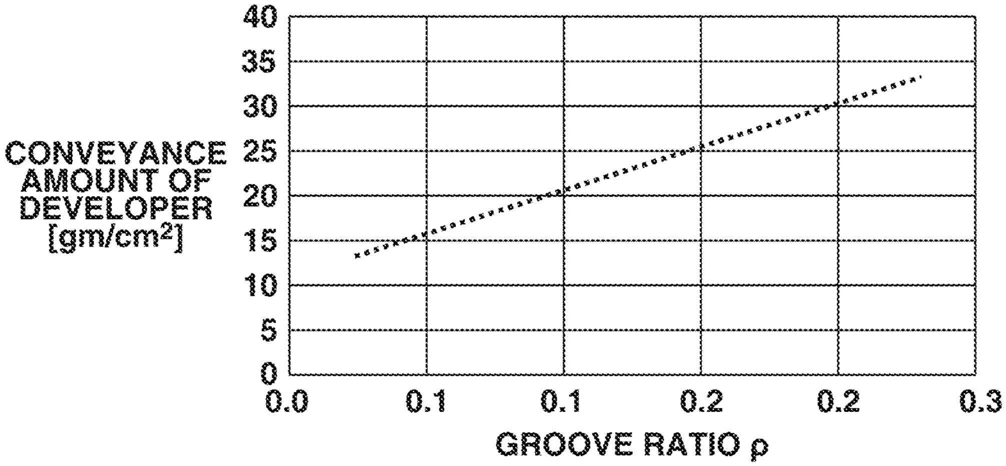
FIG. 7B is a graph illustrating a relationship between a groove ratio ρ of a sleeve and a conveyance amount of developer.

FIG. 7A is a graph illustrating a relationship between the surface roughness Rz of a sleeve having a surface formed by the blasting processing and a conveyance amount of developer. FIG. 7B is a graph illustrating a relationship between the groove ratio $\rho$ of a sleeve having a grooved surface and a conveyance amount of developer.

In the graphs in FIGS. 7A and 7B, a combination of the surface roughness Rz and the groove ratio $\rho$ with which the same amount of developer can be conveyed are plotted. These graphs illustrate data describing a relationship between the surface shape and the conveyance capability, and as with the first development sleeve 33, the data is acquired from the amount of developer conveyed when only a surface shape of the sleeve is changed, while a closest distance between the surface of the first development sleeve 33 and the regulation member 50 and the rotation speed of the first development sleeve 33 are fixed.

Figure 7C:
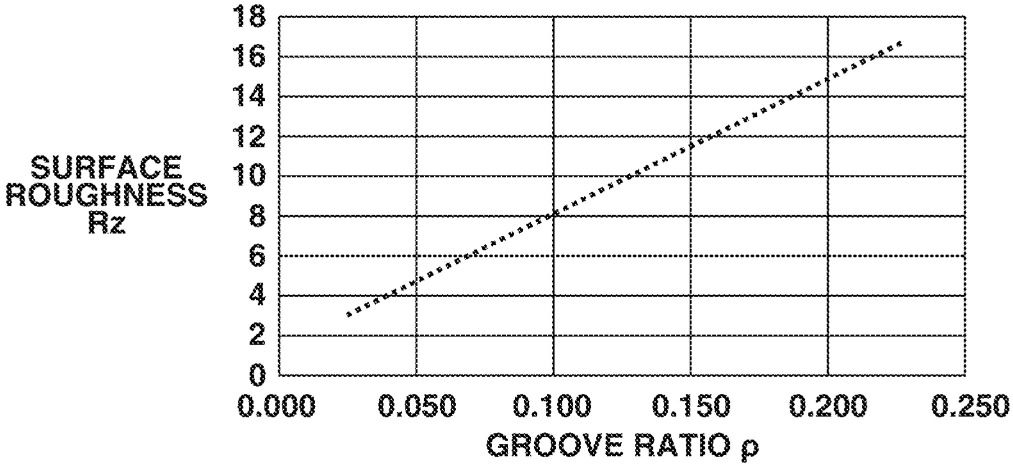
FIG. 7C is a graph illustrating a relationship between the groove ratio ρ and the surface roughness Rz.

As illustrated in FIGS. 7A and 7B, the surface roughness Rz of the sleeve having a surface formed by the blasting processing and the groove ratio $\rho$ of the sleeve having a grooved surface have a substantially linear relationship. From a graph illustrated in FIG. 7C, the following formula can be acquired with respect to the surface roughness Rz and the groove ratio $\rho$ of Equation (6), set forth below:

$$Rz = \alpha \times \rho + \beta. \tag{6}$$

Based on the above-described relationship, it is possible to provide appropriate configurations of the second development sleeve 34 and the separating sleeve 35 as a combination of the sleeve having a surface formed by the blasting processing and the sleeve having a grooved surface. In the present exemplary embodiment, acquired values $\alpha=67.2703$ and $\beta=1.4186$ are applied to Equation (6), above, which is a relational expression of the surface roughness Rz and the groove ratio $\rho$.

In other words, the above values are substituted into Equation (6), and Equation (7), below, is acquired as a conversion equation for converting the groove ratio $\rho$ into the ten-point average roughness Rz.

$$Rz = 67.2703 \times \rho + 1.4186 \tag{7}$$

In the present exemplary embodiment, a level of the dragging phenomenon of developer occurring in the second development sleeve 34 was checked with respect to each of the combination of the second development sleeve 34 having a concavo-convex surface formed by the blasting processing and the separating sleeve 35 having a concavo-convex surface of a grooved shape (described below with reference to FIGS. 8A and 8B), and the combination of the second development sleeve 34 having a concavo-convex surface of a grooved shape and the separating sleeve 35 having a concavo-convex surface formed by the blasting processing (described below with reference to FIGS. 9A and 9B).

As described in the first exemplary embodiment, with respect to the second development sleeve 34 having a surface formed by the blasting processing, the surface roughness Rz which provides the developer conveyance capability without causing the fusion bond phenomenon to occur on the surface is specified as the upper limit of the surface roughness Rz. In contrast, as described in the second exemplary embodiment, with respect to the second development sleeve 34 having a grooved surface, the groove ratio ρ which provides the developer conveyance capability is specified as a lower limit of the groove ratio ρ, and an upper limit of the groove ratio ρ is determined depending on occurrence/non-occurrence of the dragging phenomenon.

FIGS. 8A, 8B, 9A, and 9B are tables illustrating results of a relationship that occurs of the above-described dragging phenomenon of developer when the surface roughness Rz or the groove ratio ρ was applied in a similar way as in the first and the second exemplary embodiments. Based on an evaluation conducted on the dragging phenomenon, the above-described process speed was a predetermined process speed (a circumferential speed of the photosensitive drum 28Y was 513 mm/sec.) and the predetermined process speed was increased by 10% (the circumferential speed of the photosensitive drum 28Y was 564.3 mm/sec.).

When the circumferential speed of the photosensitive drum 28Y was increased, an overall operation speed, i.e., the operation speed of each of the first development sleeve 33 and the second development sleeve 34, of the development apparatus 1Y was also set to a speed 10% higher than the overall operation speed of the development apparatus 1Y when the circumferential speed of the photosensitive drum 28Y was a predetermined process speed. In the tables illustrated in FIGS. 8A, 8B, 9A, and 9B, a symbol "○" indicates that the dragging phenomenon did not occur, a symbol "Δ" indicates that a sign of behavior causing the dragging phenomenon was observed but an influence on an image was not observed, and a symbol "x" indicates that the dragging phenomenon occurred. A symbol "◆" indicates occurrence of the fusion bond phenomenon, where toner was melted and adhered to the surface of the second development sleeve 34.

FIG. 8A illustrates occurrence/non-occurrence of the dragging phenomenon when magnitude of the surface roughness Rz1 of the second development sleeve 34 and magnitude of the groove ratio ρ2 of the separating sleeve 35 were combined at a predetermined process speed. FIG. 9A illustrates occurrence/non-occurrence of the dragging phenomenon when magnitude of the groove ratio ρ1 of the second development sleeve 34 and magnitude of the surface roughness Rz2 of the separating sleeve 35 were combined at a predetermined process speed.

FIG. 8B illustrates occurrence/non-occurrence of the dragging phenomenon when magnitude of the surface roughness Rz1 of the second development sleeve 34 and magnitude of the groove ratio ρ2 of the separating sleeve 35 were combined at a process speed increased by 10% from the predetermined process speed. FIG. 9B illustrates occurrence/non-occurrence of the dragging phenomenon when magnitude of the groove ratio ρ1 of the second development sleeve 34 and magnitude of the surface roughness Rz2 of the separating sleeve 35 were combined at a process speed increased by 10% from the predetermined process speed.

In each of FIGS. 8A and 8B, a value acquired by converting the groove ratio ρ2 of the separating sleeve 35 into the surface roughness Rz through Equation (7), above, is also illustrated. In each of FIGS. 9A and 9B, a value acquired by converting the surface roughness Rz2 of the separating sleeve into the groove ratio ρ is also illustrated. Although Equation (7) provides a formula for converting the groove ratio ρ into the surface roughness Rz, a formula for converting the surface roughness Rz into the groove ratio ρ can be acquired by modifying Equation (7).

Similarly to the case described in the first exemplary embodiment, in a case where the process speed was increased, the dragging phenomenon occurred in a combination of sleeves having small surface roughness, even the dragging phenomenon did not occur when the process speed of the image forming apparatus was a predetermined speed. In contrast, when values which satisfy the conditions specified by Equations (1) and (2) were set to the indexes indicating the surface shapes of the respective sleeves by using the conversion of Equation (7), it was possible to suppress occurrence of the dragging phenomenon when the process speed was increased, even if a sleeve having been processed through the blasting method was combined with a sleeve having a grooved surface. As with the case described in the second exemplary embodiment, when values which satisfy the conditions specified by Equations (4) and (5), above, were set to the indexes indicating the surface shapes of the respective sleeves by using the conversion formula of Equation (7), it was possible to suppress occurrence of the dragging phenomenon when the process speed was increased even if a sleeve having a surface processed through the blasting method was combined with a sleeve having a grooved surface.

As described above, according to the present exemplary embodiment, occurrence of the dragging phenomenon can also be suppressed when the process speed is increased substantially, by setting an index value whose relationship with an index value converted through the conversion of Equation (7) satisfies the conditions described in the first and the second exemplary embodiments even if the second development sleeve 34 and the separating sleeve 35 have different surface shapes. It is therefore possible to provide an image forming apparatus that produces high-quality images.

A fourth exemplary embodiment will now be described with reference to FIG. 10 and FIG. 11B. In the above-described exemplary embodiments, the rotation center R2 of the separating roller 32 is located on the upper side of the rotation center R1 of the second development roller 31 in the vertical direction. In the present exemplary embodiment, in contrast, the rotation center R2 of the separating roller 32 is located on the lower side of the rotation center R1 of the second development roller 31 in the vertical direction. The other configurations and operations are similar to those described in the first exemplary embodiment. Illustration and description are thus omitted or simplified with respect to the configuration similar to that of the first exemplary embodiment, and points different from the first exemplary embodiment are mainly described.

In a development apparatus 1A according to the present exemplary embodiment, the developer can almost thoroughly be received by the separating roller 32 and collected by the developer collection unit 47 when developer borne on the second development sleeve 34 is separated off in a region where the separating magnetic field is formed by the second magnet 37.

Figure 10:
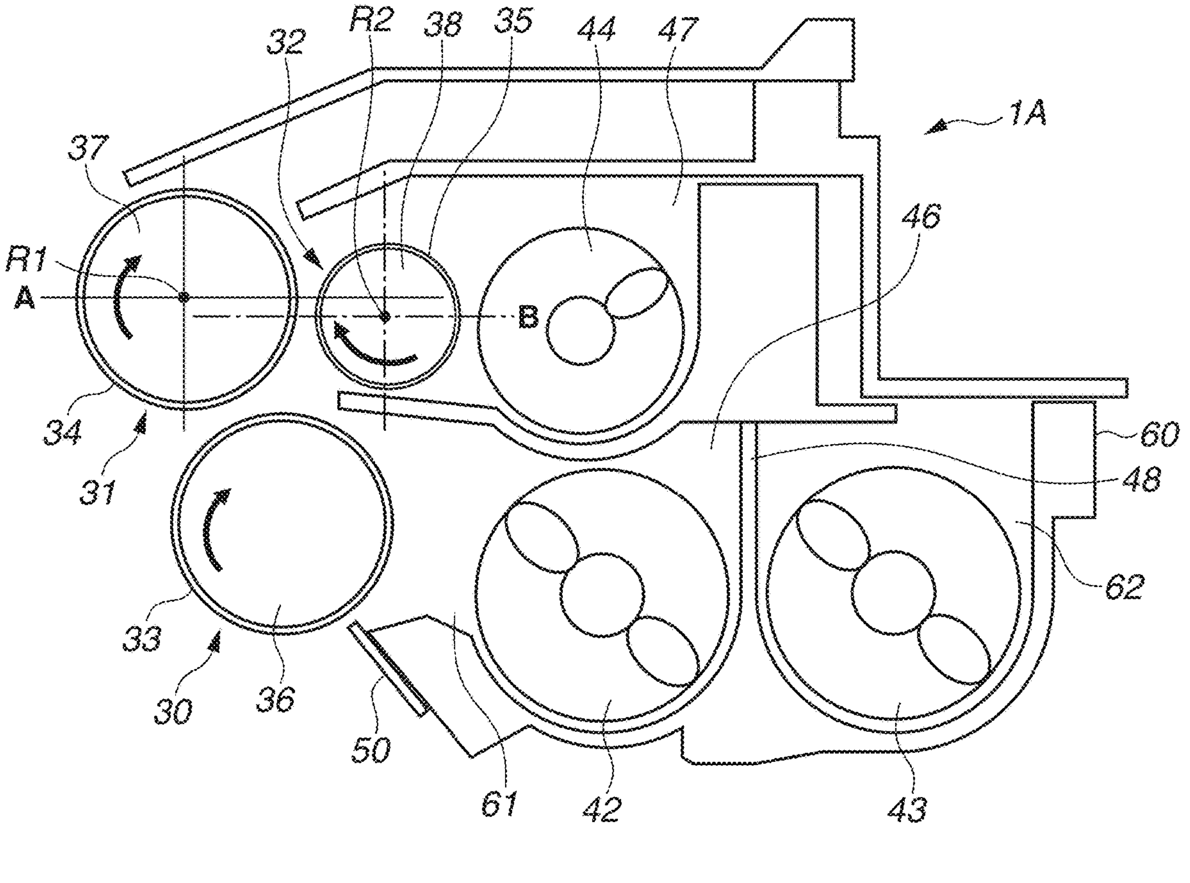
FIG. 10 is a cross-sectional diagram illustrating a schematic configuration of a development apparatus according to a fourth exemplary embodiment.

As illustrated in FIG. 10, in the present exemplary embodiment, a positional relationship between the second development roller 31 and the separating roller 32 is optimized. In other words, in the present exemplary embodiment, a horizontal line B passing through the rotation center R2 of the separating roller 32 is located at a position on the lower side of a horizontal line A passing through the rotation center R1 of the second development roller 31 in the vertical direction.

With this configuration, an influence of the magnetic force generated by the second magnet 37, which is exerted on the developer separated from the surface of the second development sleeve 34, is weakened, and the developer separated from the surface of the second development sleeve 34 is borne on the surface of the separating sleeve 35 by the magnetic force generated by the third magnet 38 and conveyed to the developer collection unit 47.

Here, it is desirable that the rotation direction of a surface of the separating sleeve 35 be opposite to the rotation direction of a surface of the second development sleeve 34 at a position where the separating sleeve 35 faces the second development sleeve 34. This is the most efficient way of preventing developer from falling downward in the vertical direction.

At this time, if the developer conveyance capability possessed by the separating sleeve 35 is low, the separating sleeve 35 cannot sufficiently receive developer from the second development sleeve 34. Thus, the unreceived developer is dragged round after falling down in the vertical direction in the region where the separating magnetic field is formed by the second magnet 37. In contrast, in a case where the second development sleeve 34 and the separating sleeve 35 rotate in the forward direction at a facing position, the separating sleeve 35 conveys the developer received from the second development sleeve 34 toward the developer collection unit 47 while bearing the developer to the lower side in the vertical direction. In a case where the separating sleeve 35 rotates in the forward direction, the surface of the separating sleeve 35 is required to have a developer conveyance capability higher than the developer conveyance capability required when the separating sleeve 35 rotates in the opposite direction.

In the present exemplary embodiment, the second development sleeve 34 and the separating sleeve 35 having the surfaces formed by the blasting processing are used, similarly to the first exemplary embodiment.

FIGS. 11A and 11B are tables illustrating results of a relationship with occurrence of the above-described dragging phenomenon of developer when the surface roughness Rz1 of the second development sleeve 34 and the surface roughness Rz2 of the separating sleeve 35 were applied. This evaluation was conducted on the dragging phenomenon when the above-described process speed was a predetermined process speed (when a circumferential speed of the photosensitive drum 28Y was 513 mm/sec.) and when the predetermined process speed was increased by 20% (when the circumferential speed of the photosensitive drum 28Y was 615.6 mm/sec.).

When the circumferential speed of the photosensitive drum 28Y was increased, an overall operation speed of the development apparatus 1A, such as the operation speed of each of the first development sleeve 33 and the second development sleeve 34, was also set to a speed 20% higher than the overall operation speed of the development apparatus 1A when the circumferential speed of the photosensitive drum 28Y was a predetermined process speed. In each of the tables illustrated in FIGS. 11A and 11B, a symbol "○" indicates that the dragging phenomenon did not occur, a symbol "Δ" indicates that a sign of behavior causing the dragging phenomenon was observed but an influence on an image was not observed, and a symbol "x" indicates that the dragging phenomenon occurred. A symbol "♦" indicates occurrence of the fusion bond phenomenon, where toner was melted and adhered to the surface of the second development sleeve 34.

FIG. 11A illustrates occurrence/non-occurrence of the dragging phenomenon when conditions of the surface roughness Rz1 of the second development sleeve 34 and conditions of the surface roughness Rz2 of the separating sleeve 35 were combined at a process speed increased by 20% from the predetermined process speed, in the configuration according to the first exemplary embodiment. The second development sleeve 34 and the separating sleeve 35 whose surfaces were formed by the blasting processing were combined. A horizontal column describes the surface roughness Rz1 of the second development sleeve 34, whereas a vertical column describes a roughness ratio of the surface roughness Rz2 of the separating sleeve 35 to the surface roughness Rz1 of the second development sleeve 34. In a case where the separating sleeve 35 rotated in a forward direction with respect to the second development sleeve 34, occurrence of the dragging phenomenon was reduced when the developer conveyance capability was improved by the surface shape.

FIG. 11B illustrates occurrence/non-occurrence of the dragging phenomenon when conditions of the surface roughness Rz1 of the second development sleeve 34 and conditions of the surface roughness Rz2 of the separating sleeve 35 were combined at a process speed increased by 20% from the predetermined process speed, in the configuration according to the present exemplary embodiment.

As illustrated in FIG. 11A, in a case where the process speed was increased by 20% when the separating sleeve 35 rotated in the forward direction, the minor dragging phenomenon occurred under the condition of the surface shape where the developer conveyance capability was low. In contrast, as illustrated in FIG. 11B, in a case where the process speed was increased by 20% when the separating sleeve 35 was rotated in the opposite direction with respect to the second development sleeve 34, the dragging phenomenon was less likely to occur under the condition of the surface shape where the developer conveyance capability was low. Under the condition of the surface shape where the developer conveyance capability was high, a position where the separating sleeve 35 and the second development sleeve 34 came closest to each other was likely to be included in the region where the separating magnetic field was formed by the second magnet 37. Thus, friction between developer and the surface formed by the blasting processing was decreased, so that the fusion bond phenomenon was less likely to occur and image failure was reduced.

As described above, in the present exemplary embodiment, the positional relationship between the second development roller 31 and the separating roller 32 is optimized, and the surface of the separating sleeve 35 rotates in a direction opposite to the rotation direction of the surface of the second development sleeve 34 at a position where the second development sleeve 34 and the separating sleeve 35 face each other. In this way, occurrence of the dragging phenomenon is suppressed even if the process speed is increased substantially, and it is possible to provide an image forming apparatus that produces high-quality images.

The above-described fourth exemplary embodiment is applicable not only to the configuration according to the first exemplary embodiment but also to the configurations according to the second and the third exemplary embodiments. In other words, even in both cases where the second development sleeve 34 and the separating sleeve 35 have the grooved surfaces and where any one of the sleeves 34 and 35 has a concavo-convex surface formed by the blasting processing and another one of the sleeves 34 and 35 has a grooved surface, the positional relationship between the second development roller 31 and the separating roller 32 may be optimized as described in the fourth exemplary embodiment, and the surface of the separating sleeve 35 may rotate in a direction opposite to the rotation direction of the surface of the second development sleeve 34 at a position where the second development sleeve 34 and the separating sleeve 35 face each other.

In the above-described exemplary embodiments, the development apparatus having two development rollers is described. The present disclosure may also be applied to a development apparatus having a single development roller. In other words, the present disclosure may also be applied to a development apparatus having a single development roller for developing an electrostatic latent image borne on an image bearing member such as a photosensitive drum and a separating roller for separating a developed image from this development roller.

The present disclosure is not limited to the configurations according to the above-described exemplary embodiments. For example, the image forming apparatus 100 is not limited to the MFP, and can be a copying machine, a printer, or a facsimile apparatus. The configurations of the developer supply screw 42, the developer agitation screw 43, and the developer collection screw 44 are not limited in particular as long as developer can be conveyed by the screws 42, 43, and 44. For example, a helical blade or a paddle-like blade can be used as the screws 42, 43, and 44.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-143076, filed Sep. 4, 2023, which is hereby incorporated by reference herein in its entirety.

What is claimed is:

1. A development apparatus comprising:

a first chamber configured to accommodate developer including toner and carriers;

a second chamber separated from the first chamber by a partition wall;

a first roller to which the developer is supplied, the first roller being configured to bear and convey the developer to develop an electrostatic latent image;

a first magnet arranged within the first roller;

a second roller to which the developer is delivered, the second roller being arranged to face the first roller, the second roller being configured to collect the developer in the second chamber after the electrostatic latent image is developed; and a second magnet arranged within the second roller, wherein a plurality of first grooves is formed on an outer circumferential surface of the first roller along a circumferential direction of the first roller, wherein a plurality of second grooves is formed on an outer circumferential surface of the second roller along a circumferential direction of the second roller, and wherein, in a case where a width of the first groove is d1, a number of the first grooves per circumference of the first roller is N1, a circumferential length of the first roller is L1, and a groove ratio ρ1 of the first groove is ρ1=(d1×N1)/L1, whereas a width of a second groove is d2, a number of the second grooves per circumference of the second roller is N2, a circumferential length of the second roller is L2, and a groove ratio ρ2 of the second groove is ρ2=(d2× N2)/L2, with $$0.40\times\rho 1\leq\rho 2$$

and $$0.07\leq\rho 1\leq 0.23.$$

2. The development apparatus according to claim 1, wherein $$0.53\times\rho 1\leq\rho 2.$$

3. The development apparatus according to claim 1, wherein $$1.00\times\rho 1\leq\rho 2.$$

4. The development apparatus according to claim 1, wherein $$\rho 2\leq 1.67\times\rho 1.$$

5. The development apparatus according to claim 1, wherein $$\rho 2\leq 1.60\times\rho 1.$$

6. The development apparatus according to claim 1, wherein the second roller is configured to rotate at a circumferential speed faster than a circumferential speed of the first roller.

7. The development apparatus according to claim 1, wherein a rotation direction of the second roller at a position where the second roller faces the first roller is the same as a rotation direction of the first roller at a position where the first roller faces the second roller.

8. The development apparatus according to claim 1, wherein a rotation center of the second roller is located above a rotation center of the first roller.

9. The development apparatus according to claim 1, further comprising:

a first conveyance screw configured to convey the developer accommodated in the first chamber, the first conveyance screw being arranged in the first chamber; and a second conveyance screw configured to convey the developer collected in the second chamber, the second conveyance screw being arranged in the second chamber, wherein a rotation center of the second conveyance screw is located above a rotation center of the first conveyance screw.

10. The development apparatus according to claim 1, further comprising:

a third roller to which the developer accommodated in the first chamber is supplied, at least a portion of which is arranged to face the first roller, the third roller being configured to bear and convey the developer to develop the electrostatic latent image; and a third magnet arranged within the third roller, wherein a rotation direction of the first roller at a position where the first roller faces the third roller is opposite to a rotation direction of the third roller at a position where the third roller faces the first roller, and wherein the developer is delivered to the first roller from the third roller through a magnetic field generated by the third magnet.

* * * * *